United States Patent [19]

Kühn

[11] Patent Number: 4,895,707

[45] Date of Patent: Jan. 23, 1990

[54] SOOT BURN-OFF FILTER FOR DIESEL ENGINES

[75] Inventor: Michael Kühn, Filderstadt, Fed. Rep. of Germany

[73] Assignee: Daimler-Benz Aktiengesellschaft, Stuttgart, Fed. Rep. of Germany

[21] Appl. No.: 310,909

[22] Filed: Feb. 16, 1989

[30] Foreign Application Priority Data

Feb. 27, 1988 [DE] Fed. Rep. of Germany ....... 3806324

[51] Int. Cl.[4] .......................... F01N 3/10; F01N 3/02; B01D 39/20

[52] U.S. Cl. ...................................... 422/177; 55/461; 55/466; 55/484; 55/523; 55/DIG. 30; 60/299; 60/311

[58] Field of Search ................. 55/461, 466, 482, 484, 55/523, DIG. 30; 60/299, 311; 422/177, 178

[56] References Cited

U.S. PATENT DOCUMENTS

| | | | |
|---|---|---|---|
| 297,436 | 4/1884 | Ortman et al. | 55/461 |
| 502,071 | 7/1893 | Gale | 55/461 |
| 4,466,817 | 8/1984 | Faas et al. | 55/DIG. 30 |

FOREIGN PATENT DOCUMENTS

| | | | |
|---|---|---|---|
| 3017784 | 11/1981 | Fed. Rep. of Germany . | |
| 3027499 | 2/1982 | Fed. Rep. of Germany . | |
| 3609151 | 10/1987 | Fed. Rep. of Germany . | |
| 433943 | 4/1948 | Italy | 55/461 |

OTHER PUBLICATIONS

"Automobile Revue Year 82", No. 44; Oct. 29, 1987, pp. 41(+).

*Primary Examiner*—Jay H. Woo
*Assistant Examiner*—C. Scott Bushey

[57] ABSTRACT

Meander-shaped exhaust gas ducts pass through a soot burn-off filter made of porous ceramic filter material. Catalytically coated blind ducts branch from each of the outer bends to receive and combust solid combustion residues from the exhaust gases. The residual gases produced in the blind ducts by the oxidation of the combustion residues pass through the filter material into adjacent discharge ducts and are transported from there to the outside of the filter. In this way the exhaust gas ducts remain largely free of solid combustion residues, display no clogging phenomena and therefore keep the exhaust gas backpressure low. This improves the starting behavior of an engine, achieves more favorable warm-up behavior and has a positive influence upon the response behavior of an exhaust gas turbocharger.

20 Claims, 1 Drawing Sheet

SOOT BURN-OFF FILTER FOR DIESEL ENGINES

BACKGROUND AND SUMMARY OF THE INVENTION

The invention relates to a soot burn-off filter for diesel engines, comprising a porous ceramic filter material with gas ducts passing therethrough.

Filters of the general type for segregating solid combustion residues, such as soot particles, from the exhaust gases of an internal combustion engine are generally known (Automobile Revue Year 82, No. 44 of 29.10.1987, page 41 and following). They are customarily monolithic filter blocks made of gas permeable porous ceramic material, such as cordierite for example. This ceramic element is penetrated in its longitudinal direction by straight ducts extending parallel to each other. Some of these ducts are open only towards the engine side, whereas others exhibit apertures only towards the exhaust side. The arrangement of these two stated types of exhaust gas ducts is chosen so that ducts of different types are always adjacent. The soot laden exhaust gases which flow through the ducts open to the engine, pass through the porous duct walls into the adjacent ducts open to the exhaust side. The soot particles are deposited in the first ducts and the exhaust gases leave the filter system through the ducts open towards the exhaust. Prolonged operation at low engine speeds and correspondingly low exhaust gas temperatures progressively clog the filter with the soot particles without any possibility of regenerating the filter by oxidizing the soot particles. This results in a higher exhaust gas backpressure, which particularly prejudices the starting characteristic behavior of the engine in the warm-up phase. A higher exhaust gas backpressure also impairs the response behavior of a exhaust gas turbocharger which may be in use.

The object of the instant invention is to produce a soot burn-off filter which permits the soot to be burnt off without additional devices, even in the presence of a high soot concentration and with as low an exhaust gas backpressure as possible. This object is obtained by having a soot burn-off filter for diesel engines with a porous ceramic filter material. Exhaust gas ducts pass through the latter in meander shape from the inflow side to the outflow side and are provided with branching blind ducts at outer bends of their meander shape. Adjacent discharge ducts are also provided in the porous ceramic filter and open towards the outflow side and are associated with the blind ducts.

Advantages are obtained when the blind ducts extend towards the outflow side and when the discharge ducts extend parallel to the blind ducts. Also the blind ducts are provided with a catalytic coating to enhance oxidation of the soot particles collected therein.

It is also advantageous if the filter consists of individual filter elements which are arranged superposed in layers and separated from each other by cover plates. These filter elements and their cover plates can be connected by sintering.

A ceramic filter element, known per se, is constructed so that exhaust gas ducts pass through it continuously in meander shape from the engine-side inflow aperture to the exhaust-side outflow aperture. At the outer bends of the meander-shaped turns said exhaust gas ducts branch into respective blind ducts which extend in the longitudinal direction towards the outflow side of the filter. At the outer bends of the exhaust gas duct turns, solid constituents, such as soot particles, become separated from the exhaust gas stream due to their mass and to the curved path which they describe, and pass by inertia centrifugal force into the blind ducts, in which they are accumulated. As soon as an exhaust gas temperature which is necessary for the oxidation of the soot particles is attained, the soot particles ignite in the blind ducts. Discharge ducts are provided in the filter adjacent to the blind ducts and extend straight and parallel to the latter. The residual gas which is produced by the oxidation of the soot particles in the blind ducts passes through the porous partition into the discharge ducts which are open to the outflow side. In this way, the exhaust gas which flows through the meander-shaped exhaust gas ducts on the one hand, and the residual gas produced by the oxidation of the soot particles in the blind ducts and transported through the discharge ducts on the other hand, exit at the outflow side of the filter.

In order to promote the oxidation of the soot particles in spite of the low exhaust gas temperatures of diesel engines, a catalytic coating may preferably be applied to the surface of the blind ducts.

The advantages of the invention are that due to the continuous exhaust gas ducts, a low exhaust gas backpressure can be achieved even where the filter is heavily charged with soot. However, low exhaust gas backpressures are necessary for correct starting behavior and operating behavior during the warm-up phase. Low exhaust gas backpressures also favor the response behavior of any exhaust gas turbochargers used, which react sensitively to backpressures.

In order to obtain an overall flow cross-section of the ducts in the filter which is sufficient for the operation of the internal combustion engine, the above described duct arrangements must be arranged juxtaposed and superposed in corresponding number.

One possibility of executing such a filter is to construct it from a plurality of filter elements. In this case a filter element comprises the arrangement of a plurality of exhaust gas ducts with the associated blind ducts and discharge ducts juxtaposed in one plane. The overall filter therefore consists of an arrangement of layers of such individual filter elements, which are separated from each other by cover plates. The connection of the filter elements and cover plates to form a complete filter may be effected by sintering for example.

Other objects, advantages and novel features of the present invention will become apparent from the following detailed description of the invention when considered in conjunction with the accompanying drawings.

DETAILED DESCRIPTION OF THE DRAWINGS

Figure 1:
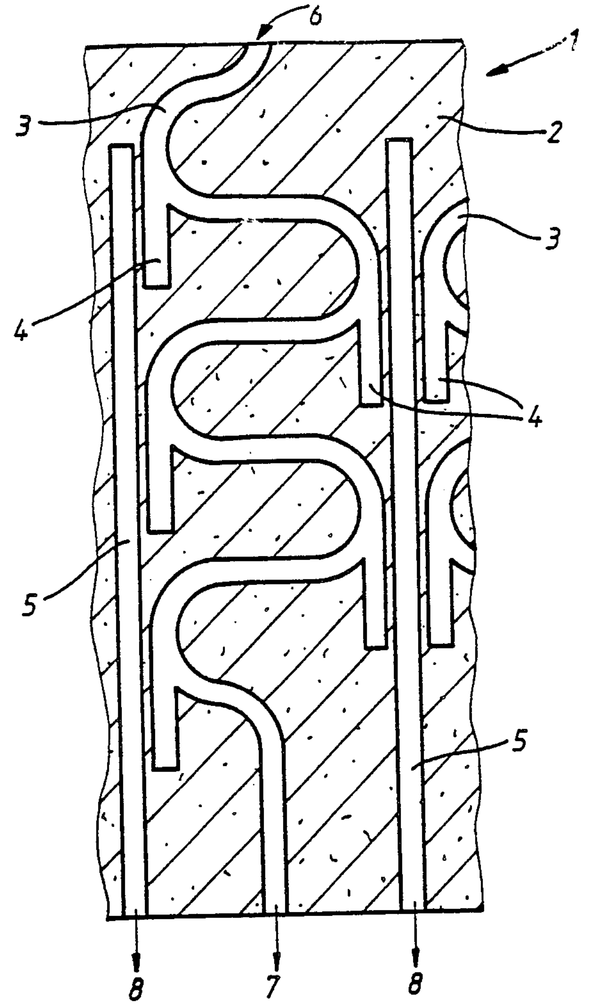
FIG. 1 shows a longitudinal section through a filter element.

FIG. 1 shows a detail of a longitudinal section through a filter element 1. Such a filter element 1 consists of porous ceramic filter material 2 which is penetrated by meander-shaped exhaust gas ducts 3 from the inflow side 6 to the outflow side 7. Blind ducts 4 which branch respectively from the outer bends of the exhaust gas ducts 3 may be provided with a catalytic coating to lower the ignition temperature of soot particles. In the exemplary embodiment of the invention shown here, the blind ducts 4 are arranged in the longitudinal direction of the filter element 1, and the discharge ducts 5, which are open only towards the outflow side, extend parallel to them. Other runs are of course also possible for these ducts, but in them, blind ducts 4 and discharge ducts 5 should preferably extend equidistantly over as large a region as possible. Exhaust gas 6, which comes from an internal combustion engine, contains solid combustion residues such as soot particles, which flow through the exhaust gas ducts 3. The soot particles in the exhaust gas flow with the exhaust gas through the turns of the exhaust gas ducts 3. The soot particles are constrained to describe a curved path. Due to their greater mass as compared to the gas, they pass by inertia centrifugal force into the blind ducts 4 which branch off at the outer bends of the exhaust gas ducts 3, and are collected there. In this way the exhaust gas ducts 3 remain largely clear of solid combustion residues, and therefore cannot build up an increased exhaust gas backpressure caused by clogging.

By a catalytic coating of the blind ducts 4, the soot particles collected there ignite at even lower temperatures than would be the case without a catalyst. This is particularly important in diesel engines, because due to the lower exhaust gas temperatures of diesel engines, ignition of the soot particles is impossible without external influences. Once ignition has occurred, the oxidation process continues to be maintained by the energy liberated by the combustion of the soot particles. The residual gases 8 produced by the oxidation pass through the partition consisting of the porous filter material 2 which is present between the blind ducts 4 and discharge ducts 5, into the discharge ducts 5, through which they leave the filter. The gases which flow through the exhaust gas ducts 3 leave the filter on the outflow side in the form of an exhaust gas 7 purified by removal of solid combustion residues.

Figure 2:
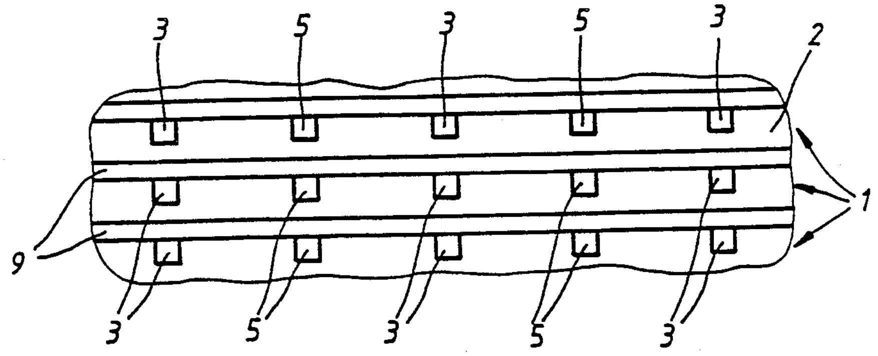
FIG. 2 shows a partial cross-sectional view of the relationship between gas ducts and discharge ducts of a layered filter element.

FIG. 2 shows by way of example the construction of such a filter from individual filter elements 1. Such an individual filter element 1 consists of a plate of porous ceramic filter material 2. A number of juxtaposed exhaust gas ducts 3, blind ducts 4 (not visible in this figure), and discharge ducts 5 are made in this plate. Said ducts may be inserted immediately in the case of cast production of the individual filter elements 1, or else they may be made by subsequent milling into the filter element 1.

A corresponding number of individual filter elements 1 are arranged superposed in order to obtain a sufficient overall flow cross-section for the soot filter. In this case, the individual filter elements are separated form each other by cover plates 9. The connection of all filter elements 1 and cover plates 9 to form a complete filter may be effected by sintering, for example.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A soot burn-off filter for diesel engines, comprising a porous ceramic filter material with exhaust gas ducts which pass through the latter in meander shape from an inflow side connected to the engine to an outflow side;
the exhaust gas ducts opening into branching blind ducts at outer bends of their meander shapes;
and adjacent discharge ducts in said porous ceramic filter material open towards the outflow side and associated with said blind ducts.

2. A soot burn-off filter according to claim 1, wherein the blind ducts extend towards the outflow side.

3. A soot burn-off filter according to claim 1, wherein the discharge ducts extend parallel to the blind ducts.

4. A soot burn-off filter according to claim 1, wherein the blind ducts are provided with a catalytic coating.

5. A soot burn-off filter according to claim 2, wherein the blind ducts are provided with a catalytic coating.

6. A soot burn-off filter according to claim 1, wherein the filter consists of individual filter elements which are arranged superposed in layers.

7. A soot burn-off filter according to claim 2, wherein the filter consists of individual filter elements which are arranged superposed in layers.

8. A soot burn-off filter according to claim 3, wherein the filter consists of individual filter elements which are arranged superposed in layers.

9. A soot burn-off filter according to claim 4, wherein the filter consists of individual filter elements which are arranged superposed in layers.

10. A soot burn-off filter according to claim 5, wherein the filter consists of individual filter elements which are arranged superposed in layers.

11. A soot burn-off filter according to claim 6, wherein the filter elements are separated from each other by cover plates.

12. A soot burn-off filter according to claim 7, wherein the filter elements are separated from each other by cover plates.

13. A soot burn-off filter according to claim 8, wherein the filter elements are separated from each other by cover plates.

14. A soot burn-off filter according to claim 9, wherein the filter elements are separated from each other by cover plates.

15. A soot burn-off filter according to claim 10, wherein the filter elements are separated from each other by cover plates.

16. A soot burn-off filter according to claim 6, wherein the filter elements and their cover plates are connected by sintering.

17. A soot burn-off filter according to claim 7, wherein the filter elements and their cover plates are connected by sintering.

18. A soot burn-off filter according to claim 8, wherein the filter elements and their cover plates are connected by sintering.

19. A soot burn-off filter according to claim 9, wherein the filter elements and their cover plates are connected by sintering.

20. A soot burn-off filter according to claim 10, wherein the filter elements and their cover plates are connected by sintering.

* * * * *